United States Patent
Cohen

[15] 3,666,246
[45] May 30, 1972

[54] COOLING SYSTEM
[72] Inventor: Paul Cohen, Madison, Pa.
[73] Assignee: Westinghouse Electric Corporation, Pittsburgh, Pa.
[22] Filed: Apr. 7, 1970
[21] Appl. No.: 26,198

[52] U.S. Cl. .............................. 261/151, 60/95 R, 165/107, 261/DIG. 11, 261/DIG. 34, 261/36 R
[51] Int. Cl. ......................................................... B01f 3/04
[58] Field of Search ................... 60/95 R; 261/151; 165/107, 165/106; 261/DIG. 34, DIG. 11, 36 R

[56] References Cited

UNITED STATES PATENTS

| | | | |
|---|---|---|---|
| 2,276,970 | 3/1942 | Hibberd | 165/60 |
| 3,249,151 | 5/1966 | Buss et al. | 261/151 X |
| 2,420,993 | 5/1947 | Kelley | 261/151 X |

FOREIGN PATENTS OR APPLICATIONS

| | | | |
|---|---|---|---|
| 1,278,153 | 10/1961 | France | 165/107 |
| 281,560 | 12/1910 | Germany | 165/107 |
| 1,006,459 | 10/1965 | Great Britain | 165/107 |
| 821,003 | 9/1959 | Great Britain | 165/107 |
| 515,502 | 11/1920 | France | 261/DIG. 34 |

*Primary Examiner*—Tim R. Miles
*Attorney*—F. Shapoe and L. P. Johns

[57] ABSTRACT

A cooling system suitable for a power plant which includes a steam condenser, for transferring heat from the steam to an aqueous solution; a cooling tower for spraying or distributing thin streams of the aqueous solution in the presence of ambient air to transfer heat to the air; and means for recirculating the aqueous solution between the condenser and the cooling tower including bypass means for controlling the solution temperature; the aqueous solution containing compound in an amount approaching saturation at room temperature, for example, from about 50 to about 60 grams of magnesium chloride per 100 grams of water, the solution being characterized by very low water vapor pressure when used as the heat dissipating fluid medium in a spray type cooling tower.

10 Claims, 1 Drawing Figure

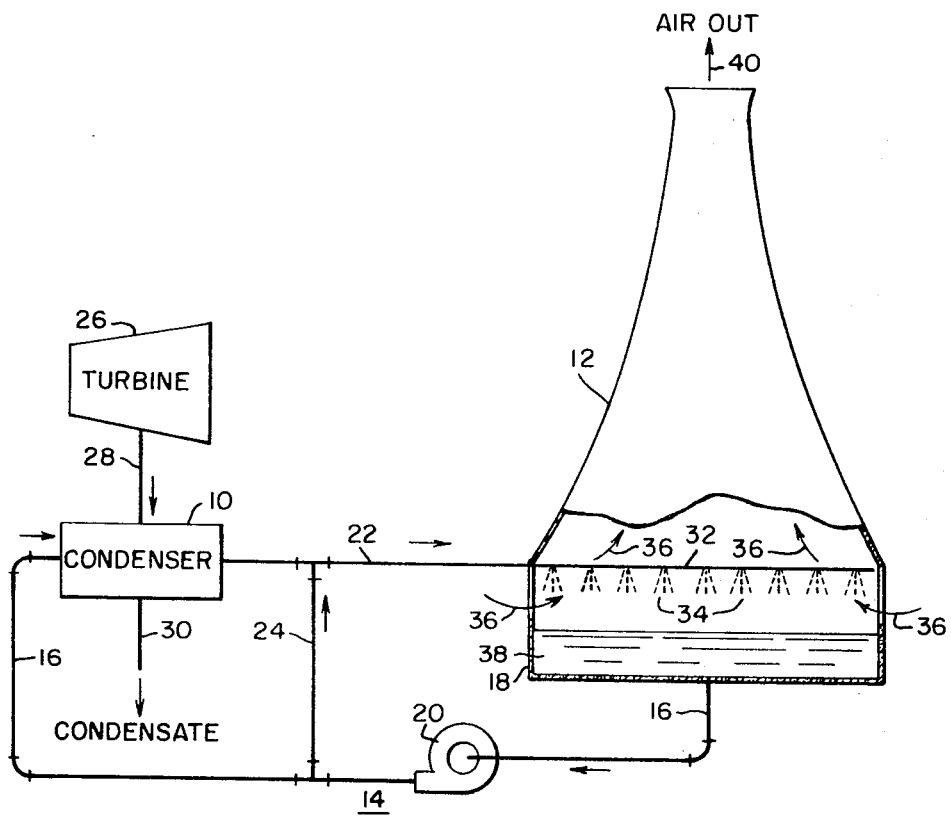

COOLING SYSTEM

BACKGROUND OF THE INVENTION

1. Field of the Invention

This invention relates to an aqueous, liquid-to-air, cooling system with a substantially nil net water transfer, and more particularly, it pertains to an aqueous solution of a compound having such characteristics that there is little loss of water vapor to the air, when the aqueous solution is sprayed or otherwise exposed in thin streams to air for transferring heat from a heat source to a cooling tower.

2. Description of the Prior Art

The rejection of heat to air from a heat source, such as a thermal power plant, may in time become absolutely essential because of either a lack of suitable sites for heat rejection to streams or oceans, because of their unavailability, thermal pollution, lack of supplies of makeup water for evaporative cooling towers, or meterological consequence of their operation. The application of systems involving massive heat rejection to air involves a tremendous economic penalty arising from the cost of the heat transfer surfaces interposed between air and the power plant coolant, and the cost of moving air over these heat transfer surfaces. A solution to this problem is required which eliminates the need for heat transfer surface and at the same time minimizes or eliminates evaporation of water.

Associated with the foregoing are such environmental and economic problems as air pollution, water conservation, as well as thermal pollution. In high population centers it is desirable to minimize the dispersion of water vapor particularly in warm seasons or climates. In addition, in arid areas it is highly desirable to conserve water. Accordingly, it is desirable to assist the engineering and economic feasibility of reducing the water replacement requirements for cooling towers through suppression of evaporation of water by incorporating certain dissolved compounds in the circulating water.

In the conventional cooling tower, as presently designed for steam plant waste heat rejection, water of ambient purity acts as an intermediate heat transfer medium, flowing downwardly over baffles or packing, or it can be sprayed. Air flows upwardly or across and removes heat from the water by sensible heat convection and by adiabatic humidification. Normally, about 70 percent of the heat dissipation is by evaporation, even under very humid conditions, and thus the water replacement rate corresponds to about one pound of water for about every 700 BTU rejected.

In areas of severely limited water supply the conventional practice is to use "dry" towers in which the heat is transferred to the atmosphere through tube walls, this requires an extensive area of tubing which is very costly, resulting in a punitive cost increase as compared to the evaporative tower costs. Accordingly, there is a need for a cheap heat transfer but without a net water loss through evaporation.

SUMMARY OF THE INVENTION

In accordance with this invention it has been found that a power plant coolant which comprises a concentrated or saturated solution of one or more appropriate compounds, or suspensions of such salts in their saturated solutions, may serve as a heat sink for the power plant system, using for this purpose conventional heat transfer apparatus optimized for the properties of the particular solution, and cooling said solutions by spraying or flowing thin streams in direct contact with air in a forced or natural draft cooling tower.

BRIEF DESCRIPTION OF THE DRAWING

For a better understanding of the invention reference is made to the attached drawing which is a diagrammatic view of a typical power plant system including a steam turbine with a condenser, a cooling tower, and conduit means for recirculating the power plant coolant.

DESCRIPTION OF THE PREFERRED EMBODIMENT

In the drawing a typical apparatus is disclosed for embodying the principles of the present invention. The apparatus includes a condenser 10, a cooling tower 12, and a solution circulating system generally indicated at 14. The solution circulating system 14 includes a conduit 16 leading from a catch basin 18 of the tower 12, a pump 20 in the conduit 16, and a solution return conduit 22. A bypass conduit 24 is provided between the conduits 16 and 22.

The condenser 10 is of conventional construction and is provided with a plurality of spaced longitudinally extending heat exchange pipes the left end (as shown in the drawing) of which are connected to the conduit 16 and the right end of which are connected to the conduit 22. The condenser 10 may be used for condensing steam from any steam operated apparatus such as a turbine 26 from which the steam passes to the condenser through a conduit 28. After the steam is condensed to water in the condenser 10, it is drained from the condenser through a conduit 30.

The cooling tower 12 is a means for cooling the heated solution conveyed from the condenser 10 to the tower. The solution is introduced into the tower 12 through a spray system 32 which communicates with the conduit 22, whereby a plurality of sprays 34 of solution distribute the solution in a fine mist or rain, thus exposing a large surface area of the solution to air currents 36 which currents rise into the cooling tower by natural convection currents or by forced air fans (not shown). The lower portion of the cooling tower below the spray system 32 may be provided with baffles or packing over which the solution trickles downwardly to form a pool 38 of solution. During its movement from the spray system 32 to the basin 18, the solution yields its heat to the air which ultimately rises out of the upper end of the cooling tower at 40.

Ultimately the solution 38 is returned to the condenser through the conduit 16 and pump 20, whereby it recirculates continuously until the turbine 26 is shut down.

Ordinarily, the currents 36 of air which mingle with the sprayed solution becomes saturated with water vapor due to the large area of moisture exposed in the cooling tower. The water is then carried upwardly and out of the tower in the form of vapor at a partial pressure as determined by atmospheric temperature. It is the evaporation and loss of water from the system that this invention seeks to avoid.

For that purpose the solution 38 is an aqueous solution of a highly soluble salt or compound which results in a reduction of the vapor pressure of the water in which the salts or compounds are dissolved, such as at least one from the group consisting of lithium bromide, lithium chloride, calcium chloride and magnesium chloride. The salt or compound is highly soluble in water and the solution has relatively low vapor pressure in the ambient temperature conditions as compared with pure water. Accordingly, when the currents 36 of air contact the droplets of spray of the solution 38 there is an exchange of heat from the solution to the air without substantial evaporation of the water in the solution, and in some case water may actually be absorbed from relatively humid air.

The preferred salt is magnesium chloride which is mixed in an amount ranging from about 50 to about 60 grams per 100 grams of water, the amount of salt required being proportional to the temperature involved. A preferred range is from 53 to about 56 grams with an optimum of about 55 grams per 100 grams of water. The following example is illustrative of the present invention.

EXAMPLE

Five saturated solutions of magnesium chloride, with crystals of $MgCl_2 \cdot 6H_2O$ in suspension, were prepared at temperatures varying from 0° to 40° C. The corresponding equilibrium vapor pressure of the water over such solutions and the concentration of magnesium chloride in the solution for temperatures from 0° to 40° C is listed in the attached Table I.

TABLE I

Water Vapor Pressure of Solutions of $MgCl_2$ in Equilibrium with $MgCl_2 \cdot 6H_2O$

| Temp. °c | V.P. of $H_2O$ in.mm/Hg. | Saturated Solution g. $MgCl_2 \cdot 6H_2O$ per +100 g. $H_2O$ |
|---|---|---|
| 0  | 1.56 | 52.3 |
| 10 | 3.08 | 53.5 |
| 20 | 5.77 | 54.7 |
| 30 | 10.3 | 56.1 |
| 40 | 17.4 | 57.6 |

It is noted that the composition of the saturated solution changes only slightly with change in temperature.

Consider the case where the temperature ($T_1$) of the solution entering the condenser is 20° C and its exit temperature ($T_2$) is 30° C and the temperature ($T_4$) of the air entering the cooling tower is 20° C (at 50 percent humidity), having an absolute water vapor pressure of 8.77 mm Hg. Because of the good contact between the solution and the air in the cooling tower it is assumed that the air temperature leaving the top of the cooling tower is equal to that of the solution ($T_3$), since the difference between them is very low. From the table a temperature $T_3$ for the water in line 22 reaching the unit 12 is selected at which the water vapor pressure of the saturated solution will be equal to 8.77 mm Hg and, by interpolation it is found that $T_3$ is 27.8° C. It is further assumed that the temperature of the solution leaving the basin 18 of the cooling tower is negligibly different from $T_1$. By further assuming a constant heat capacity over the temperature range, the ratio of flows $F_2/F_1$ of solution through the bypass 24 to the flow of solution through the condenser required is given by the formula:

$$F_1(T_2-T_3) = F_2(T_3-T_1) \quad (1)$$
$$F_1(2.2) = F_2(10) \quad (2)$$
$$F_2/F_1 = 2.2/1.0 = 0.22 \quad (3)$$

Thus, a recirculation of 22 percent of the condenser coolant flow provides the necessary condition for zero water vapor transfer from solution to the air in the tower. Moreover, control can be made automatic by measuring the dew point of the inlet and exit air, and adjusting the recirculation ratio to make these equal. The flow rate $F_1$ and the tower are designed to provide the necessary cooling capacity for the system. Conversely, the system can be operated so as to remove moisture from the air during high humidity periods and to evaporate this accumulated moisture during low humidity periods. Thus, in effect the system acts as an evaporative tower for part of its period of use and at other times obtains its moisture by extracting it from the air.

Accordingly, the nature of the invention is such that for suitable combinations of solutions, inlet and outlet temperatures of the solution, and regulation of recirculation of said cooled solutions, the dew point of the heated air may be made equal to that of the cold entering air, thus assuring no net transfer of moisture.

Although a condensing steam cycle is disclosed in the drawing, the invention is applicable to other power cycles such as gas turbines where the heat sink may be an intercooler. The device of the present invention satisfies problems of the prior art by providing a low cost system for rejecting heat from power plants without causing the evaporation of water and at the same time eliminates the need for makeup water and avoiding the meterological consequences of large scale evaporation of water.

Although the best known embodiment of the invention has been illustrated and described in detail, it is understood that the invention is not limited thereto and thereby.

What is claimed is:

1. In a thermal plant including condenser means for converting steam to water by heat exchange with an aqueous solution, a cooling tower for cooling the heated aqueous solution coming from the condenser means by contact with air at ambient temperature, said condenser means being operable to raise the temperature of said solution above the temperature of said air, and means for circulating the aqueous solution between the condenser means and the cooling tower, the improvement in which the aqueous solution at its maximum temperature during cooling contains at least one dissolved compound in an amount that renders the solution to exhibit substantially no loss of water at the ambient temperature of air of a specific humidity passing through the cooling tower.

2. The thermal plant of claim 1 wherein the compound in the aqueous solution is at least one compound selected from the group consisting of magnesium chloride, lithium chloride, and lithium bromide.

3. The thermal plant of claim 2 wherein the salt in the aqueous solution is magnesium chloride.

4. The thermal plant of claim 3 wherein there are from about 50 to about 60 grams of magnesium chloride per 100 grams of water in the aqueous solution.

5. The thermal plant of claim 1, wherein the heated aqueous solution coming from the condenser is admixed with cool solution from the cooling tower in a proportion such that the water vapor pressure thereof is substantially equal to that of the water vapor pressure in the ambient air being used for cooling.

6. In a system for dissipating heat to the air, in combination a heat source, means for absorbing heat from the heat source, said means comprising an aqueous solution of a compound in such an amount and having such characteristics when dissolved in the water that it loses none or a substantially smaller amount of water to ambient air of any usual humidity at the temperatures involved than does relatively pure water, said heat source being operable to raise the temperature of said solution above the temperature of said air, means for exposing thin streams of the heated aqueous solution to ambient air in order to transfer the heat acquired by the aqueous solution from the heat source to the air without losing any material proportion of the water by evaporation.

7. The system of claim 6, wherein the aqueous solution is at a maximum temperature of about 40° to 50° C when it leaves the heat source.

8. The system of claim 6 in which the compound comprises a deliquescent compound selected from at least one of the group consisting of calcium chloride, magnesium chloride and lithium chloride.

9. The system of claim 6 in which a circulating means circulates cooled aqueous solution from the means for exposing thin streams to the heat source, and also circulates heated aqueous solution from the heat source to the means for exposing thin streams, including bypass means for intermixing cooled aqueous solution with heated aqueous solution so as to obtain an aqueous solution having a water vapor pressure substantially equal to the water vapor pressure in the ambient air to which heat is rejected as it is exposed in such thin streams.

10. In a system for dissipating heat to air, in combination, a heat source at a temperature above ambient atmospheric air temperature and requiring dissipation of heat therefrom, an aqueous solution disposed in a closed means associated with the heat source for absorbing heat from the heat source, means for circulating the heated aqueous solution from the closed means to a cooling means wherein thin streams of the aqueous solution are exposed to the ambient air, which air has a given water vapor pressure, the temperature of the aqueous solution being above that of the ambient air, the aqueous solution containing a dissolved solid having such characteristics and present in an amount that the water vapor pressure of the aqueous solution up to a given temperature does not significantly exceed that of the ambient air so that no substantial loss of water from the thin streams of aqueous solution to the ambient air occurs, while heat is being extracted by the ambient air from the thin streams of aqueous solution, the means for circulating including both means for returning cool aqueous solution to the heat source and a bypass means for adding cool aqueous solution to hot aqueous solution coming from the heat source prior to entry to the cooling means whereby upon admixing of the cool aqueous solution to the hot aqueous solution there may be produced an aqueous solution at an intermediate temperature which does not exceed said given temperature.

\* \* \* \* \*